(12) United States Patent
Viveki et al.

(10) Patent No.: US 11,513,915 B2
(45) Date of Patent: Nov. 29, 2022

(54) SYSTEM AND METHOD FOR MICRO-BACKUP GENERATION

(71) Applicant: EMC IP Holding Company LLC, Hopkinton, MA (US)

(72) Inventors: Pradeep Viveki, Bangalore (IN); Mahantesh Murageppa Ambaljeri, Bangalore (IN); Mahesh Reddy Appireddygari Venkataramana, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/226,180

(22) Filed: Apr. 9, 2021

(65) Prior Publication Data

US 2022/0327029 A1  Oct. 13, 2022

(51) Int. Cl.
*G06F 11/14* (2006.01)
*G06F 11/30* (2006.01)
*G06F 11/07* (2006.01)

(52) U.S. Cl.
CPC ........ *G06F 11/1464* (2013.01); *G06F 11/076* (2013.01); *G06F 11/1451* (2013.01); *G06F 11/1461* (2013.01); *G06F 11/1469* (2013.01); *G06F 11/3075* (2013.01)

(58) Field of Classification Search
CPC ............. G06F 11/1464; G06F 11/1461; G06F 11/1451; G06F 11/1469; G06F 11/076; G06F 11/3075

USPC ......................................................... 714/6.3
See application file for complete search history.

(56) References Cited

U.S. PATENT DOCUMENTS

| | | | |
|---|---|---|---|
| 6,128,540 A | 10/2000 | Van Der Vegt et al. | |
| 10,216,449 B1 | 2/2019 | Li et al. | |
| 2012/0089572 A1* | 4/2012 | Raichstein | G06F 11/1461 707/645 |
| 2012/0233172 A1 | 9/2012 | Skillcom et al. | |
| 2013/0339303 A1 | 12/2013 | Potter et al. | |
| 2016/0350391 A1* | 12/2016 | Vijayan | G06F 3/0619 |
| 2017/0075698 A1 | 3/2017 | Zamir | |
| 2018/0039434 A1 | 2/2018 | Balcha | |
| 2020/0341852 A1 | 10/2020 | Chopra et al. | |
| 2021/0374645 A1 | 12/2021 | Gutman et al. | |

* cited by examiner

*Primary Examiner* — Yair Leibovich
(74) *Attorney, Agent, or Firm* — Chamberlain, Hrdlicka, White, Williams & Aughtry

(57) ABSTRACT

A backup management system for providing data integrity services to an application host that hosts an application that uses application data includes storage for storing threshold values for creating an application backup and a processor programmed to monitor: a rate of change associated with the application data, and an input-output rate of the application data; make a determination, based on the threshold values, the rate of change, and the input-output rate, that an unscheduled backup for the application is to be generated; obtain a micro-backup for the application in response to the determination; and obtain a restoration ready backup for the application using the micro-backup and at least one previously generated backup.

20 Claims, 12 Drawing Sheets

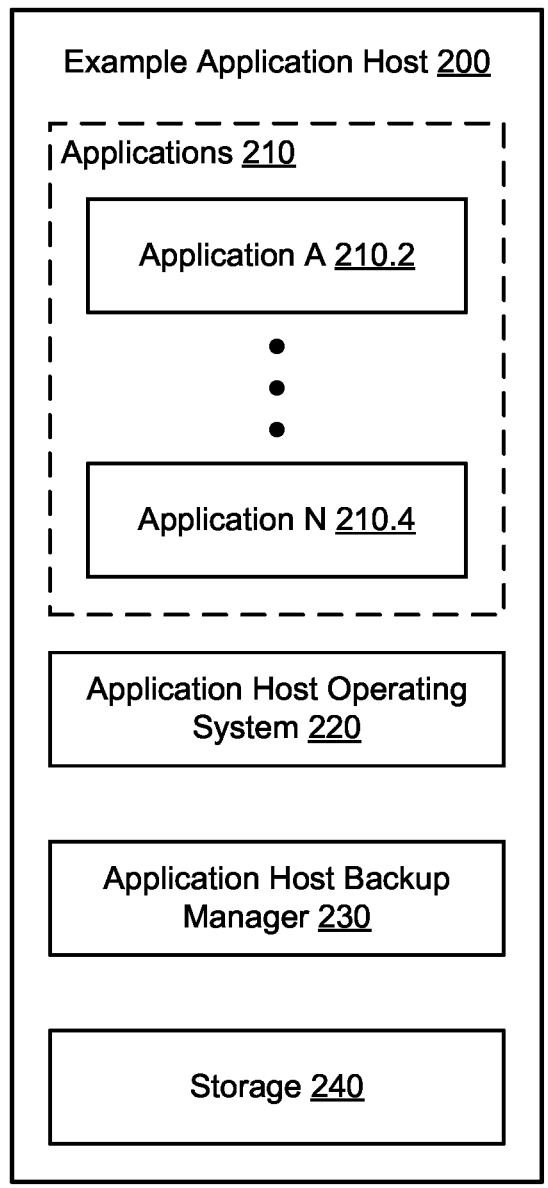
FIG. 2.1

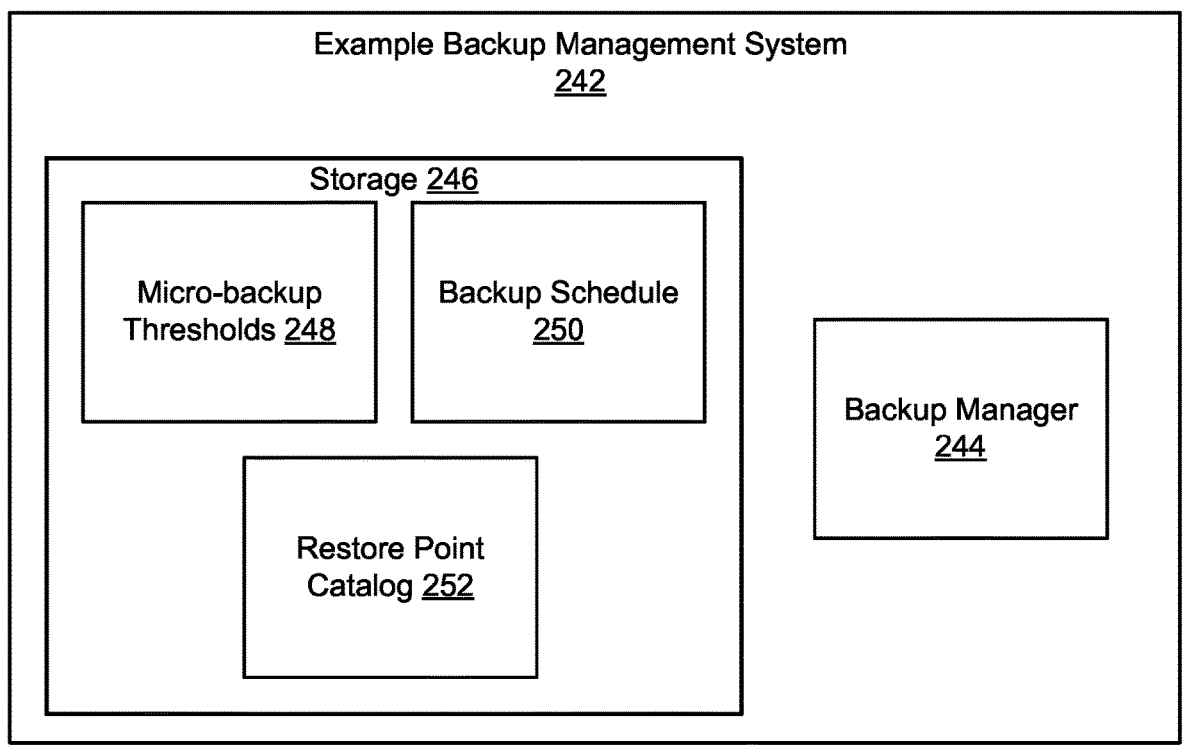
FIG. 2.2

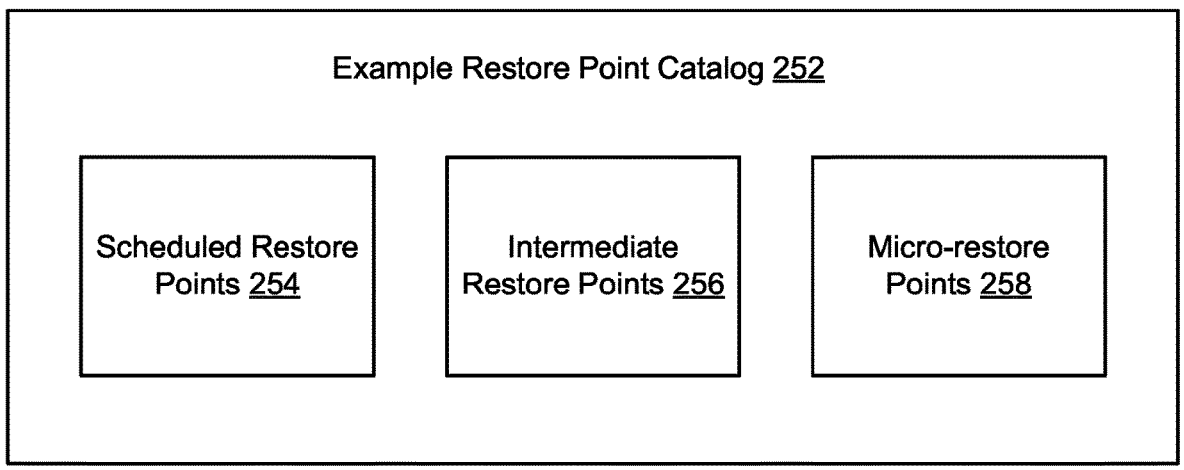
FIG. 2.3

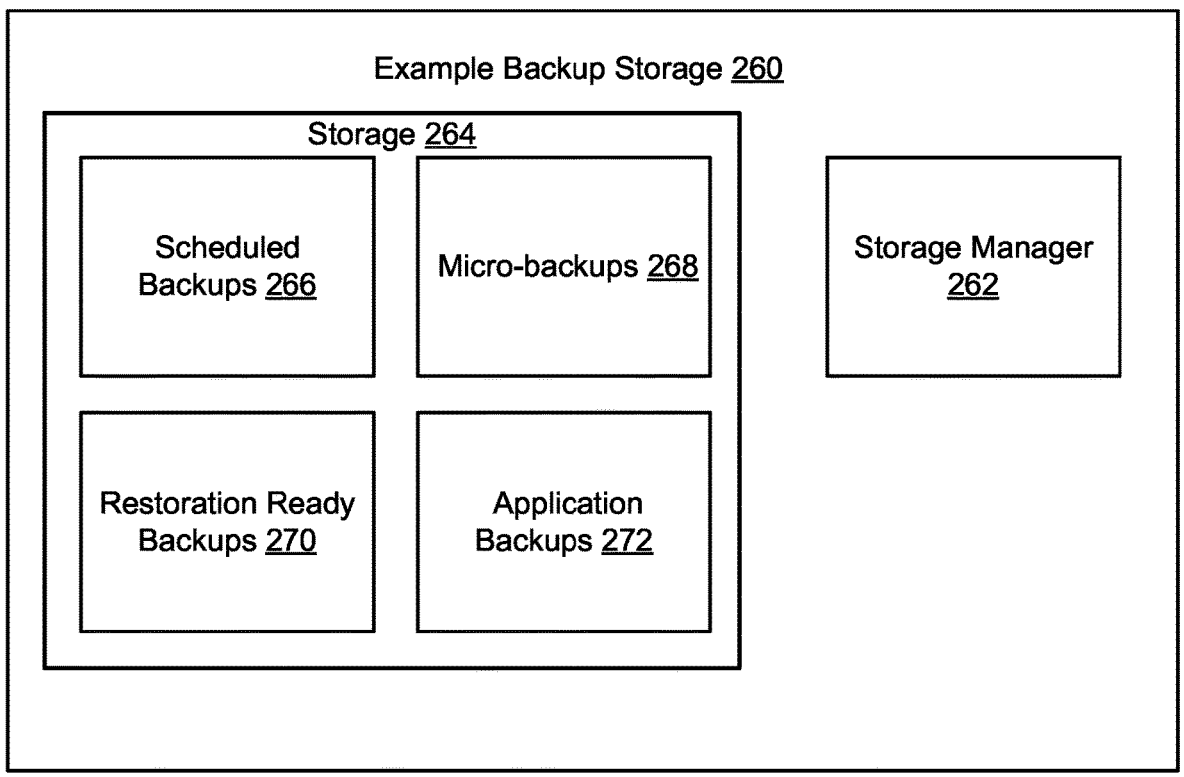
FIG. 2.4

SYSTEM AND METHOD FOR MICRO-BACKUP GENERATION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost due to device failure, software failure, etc., the data may be unrecoverable if no copies of the data were made and stored in locations other than the persistent storage.

SUMMARY

In one aspect, a backup management system for providing data integrity services to an application host that hosts an application that uses application data in accordance with one or more embodiments of the invention includes storage for storing threshold values for creating an application backup. The backup management system further includes a processor programmed to monitor: a rate of change associated with the application data, and an input-output rate of the application data; make a determination, based on the threshold values, the rate of change, and the input-output rate, that an unscheduled backup for the application is to be generated; obtain a micro-backup for the application in response to the determination; and obtain a restoration ready backup for the application using the micro-backup and at least one previously generated backup.

In one aspect, a method for providing backup services to an application host that hosts an application that uses application data in accordance with one or more embodiments of the invention includes monitoring: a rate of change associated with the application data, and an input-output rate of the application data; making a determination, based on the threshold values, the rate of change, and the input-output rate, that an unscheduled backup for the application is to be generated; obtaining a micro-backup for the application in response to the determination; and obtaining a restoration ready backup for the application using the micro-backup and at least one previously generated backup.

In one aspect, a non-transitory computer readable medium in accordance with one or more embodiments of the invention includes computer readable program code, which when executed by a computer processor enables the computer processor to perform a method for providing backup services to an application host that hosts an application having application data. The method includes monitoring: a rate of change associated with the application data, and an input-output rate of the application data; making a determination, based on the threshold values, the rate of change, and the input-output rate, that an unscheduled backup for the application is to be generated; obtaining a micro-backup for the application in response to the determination; and obtaining a restoration ready backup for the application using the micro-backup and at least one previously generated backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example application host in accordance with one or more embodiments of the invention.

FIG. 2.2 shows a diagram of an example backup management system in accordance with one or more embodiments of the invention.

FIG. 2.3 shows a diagram of a restore point catalog in accordance with one or more embodiments of the invention.

FIG. 2.4 shows a diagram of an example backup storage in accordance with one or more embodiments of the invention.

DETAILED DESCRIPTION

Figure 1:
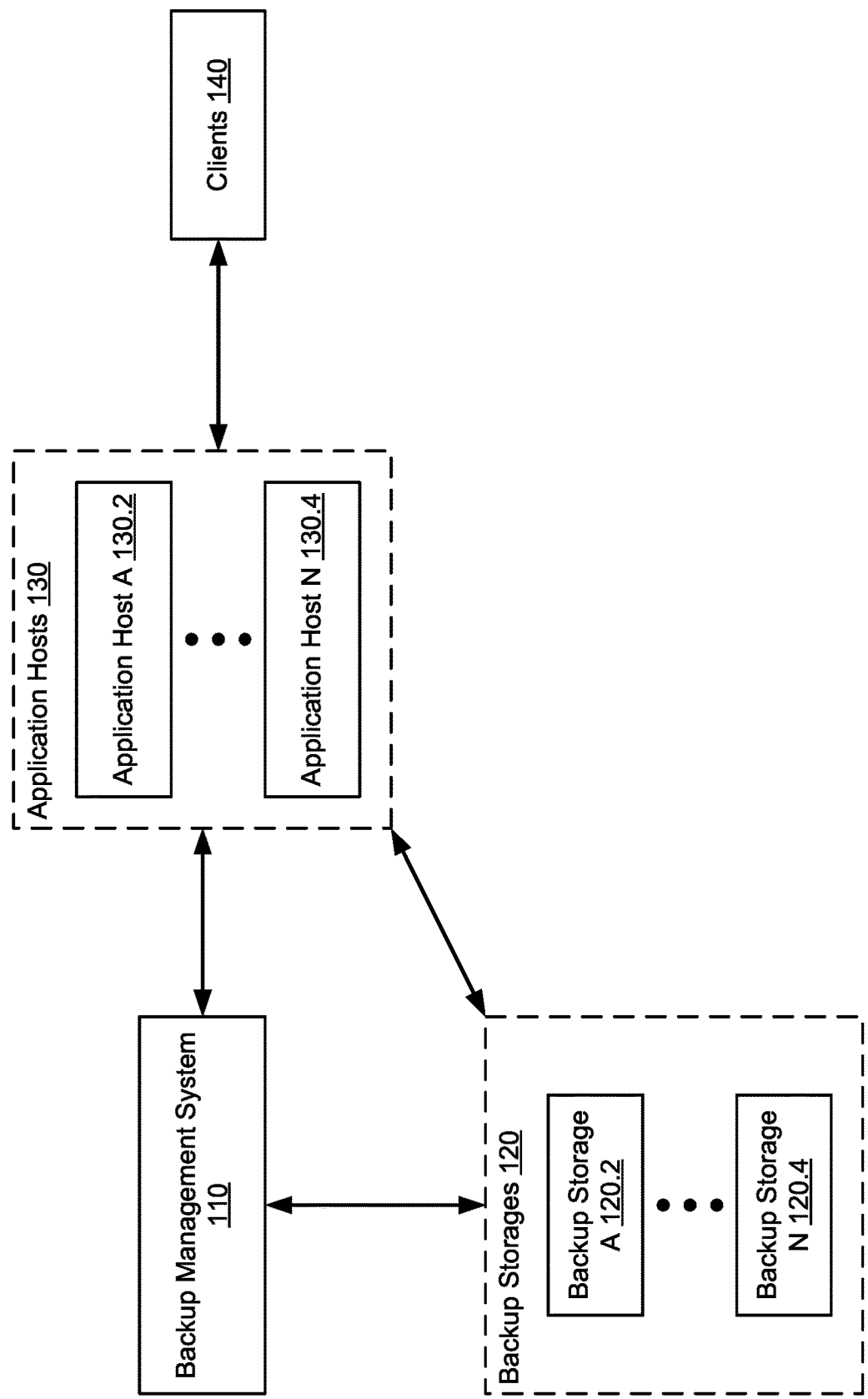
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services to an application host. Specifically, embodiments of the invention may provide a system that enables unscheduled backups of individual applications hosted by the application host (each backup of an individual application is referred to as a "micro-backup") to be generated. The system may also enable restoration of an application host and/or an individual application hosted by the application host utilizing micro-backups.

In one or more embodiments, the micro-backup is used to generate an application backup. The application backup includes application data necessary for the restoration of the application to a previous point in time, but does not include data necessary to restore the application host to the previous point in time. The application backup may be utilized when the restoration of only one application hosted by an application host is desired and the restoration of the application host is not desired. Since only the application is being restored to a previous point in time, the user can access the restored application data quicker than if a traditional restoration based on a full backup or an incremental backup of the application host is used to restore the application to the previous point in time.

In one or more embodiments, the micro-backup is used to generate a restoration ready backup. The restoration ready backup includes application host data necessary for the restoration of the application host to a first point in time and includes application data necessary to restore the application to a second point in time that is later than the first point in time. Therefore, the restoration ready backup reduces the amount of data that is lost when restoring an application host to a previous point in time.

FIG. 1 shows an example of a system in accordance with one or more embodiments of the invention. The system may include application hosts (130) that host applications such virtual machines, database applications, electronic communication applications, file sharing applications, and/or other types of applications. Further, the application hosts (130) may host applications directly or the application hosts (130) may host any number of layers of virtualization or other forms of software/hardware based resource abstraction, which, in turn, host applications utilized by clients (140). To host applications, the application hosts (130) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The use of the applications hosted by the application hosts (130) may result in the generation of data. The data may be may be important to the application hosts (130) and/or a user of the application hosts (130) and may be required to be stored for protection and/or restoration purposes. The data may be stored for other and/or additional purposes without departing from the invention. Storing the data in the hardware devices of the application hosts (130) may be problematic because hardware devices may fail. The failure of hardware device may result in data loss and/or data corruption.

To improve the likelihood that data stored in hardware devices of the application hosts (130) is available for future use, backups of the application hosts (130) may be generated and stored in the backup storages (120). A backup of one of the application hosts (130) may include data that may be used to restore all, or a portion, of the application host (130), or all, or a portion, of an entity hosted by the application host, to a previous point in time. Thus, if data hosted by one of the application hosts (130) is lost, access to the data may be restored by restoring all, or a portion, of the application host using information stored in the backup storages (120).

The system may also include a backup management system (110) that provides, in part, data protection services to the application hosts (130). The data protection services may include managing generation of scheduled backups (e.g., a full backup or incremental backup of an application host that is generated based on a schedule) for the application hosts (130), managing generation of unscheduled micro-backups of individual applications hosted by an application host, managing storage of the backups in backup storages (120), and/or managing restoration of the individual applications hosted by an application host, and/or managing restoration of the application hosts (130) using scheduled backups and/or unscheduled micro-backups stored in the backup storages (120) and/or other locations. A micro-backup may be a backup of only the individual application hosted by the application manager. An unscheduled backup may be a backup that is generated in a manner that does not conform to a schedule. For example, an unscheduled backup may be one that is generated in response to the occurrence of a condition such as, for example, a rate of change of data associated with the application being above a predetermined threshold or an input-output rate of application data that is above a predetermined threshold.

To manage backup generation and storage, the backup management system (110) may provide information to the application hosts (130) that enables the application hosts (130) to independently generate and/or store scheduled backups and/or unscheduled micro-backups in the backup storages (120). The information may include a backup schedule of when the application hosts (130) are to generate and/or store a full backup and/or an incremental backup, such as a log backup. The information may also include conditions that, when they occur, cause the application hosts to initiate generation of an application micro-backup. Such conditions may include application data of an application exceeding an input-output ("I/O") rate threshold and/or the application data exceeding an application data rate of change threshold.

The components of the system illustrated in FIG. 1 may be operably connected to each other and/or operably connected to other entities (not shown) via any combination of wired and/or wireless networks. Each component of the system illustrated in FIG. 1 is discussed below.

In one or more embodiments of the invention, the application hosts (130) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-5. The application hosts (130) may be implemented using other types of computing devices without departing from the invention. For additional details regarding computing devices, refer to FIG. 8.

In one or more embodiments of the invention, the application hosts (130) are implemented using distributed computing devices. As used herein, a distributed computing device refers to functionality provided by a logical device that utilizes the computing resources of one or more separate and/or distinct physical computing devices. For example, in one or more embodiments of the invention, the application hosts (130) is implemented using distributed devices that include components distributed across any number of separate and/or distinct computing devices. In such a scenario, the functionality of the application hosts (130) may be performed by multiple different computing devices without departing from the invention.

The application hosts (130) may be implemented using logical devices without departing from the invention. For example, the application hosts (130) may be implemented using virtual machines that utilize computing resources of any number of physical computing devices to provide the functionality of the application hosts (130). The application hosts (130) may be implemented using other types of logical devices without departing from the invention.

A system in accordance with one or more embodiments of the invention may include any number of application hosts (e.g., 130.2, 130.4) without departing from the invention. For example, a system may include a single application host (e.g., 130.2) or multiple application hosts (e.g., 130.2, 130.4).

In one or more embodiments of the invention, the application hosts (130) provides services to a client (e.g., 140). The services may include any type of computer implemented service such as, for example, database services, electronic communication services, data storage services, and/or instant messaging services. When providing such services to the clients (140), data that is relevant to the clients (140) may be stored in persistent storage of the application hosts (130).

In one or more embodiments of the invention, the application hosts (i) generate scheduled backups, such as full backups and/or incremental backups according to a schedule received from the backup management system and (ii) generate micro-backups of individual applications hosted by an application host (130). The application hosts may transfer the generated scheduled backups and micro-backups to the backup storages (120). For additional details regarding application hosts (130), refer to FIG. 2.1.

In one or more embodiments of the invention, the backup storages (120) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 3-5. The backup storages (120) may be implemented using other types of computing devices without departing from the invention. For additional details regarding computing devices, refer to FIG. 8.

In one or more embodiments of the invention, the backup storages (120) are implemented using distributed computing devices. As used herein, a distributed computing device refers to functionality provided by a logical device that utilizes the computing resources of one or more separate and/or distinct computing devices. For example, in one or more embodiments of the invention, the backup storages (120) are implemented using distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the application hosts (130). The data storage services may include storing of data provided by the application hosts (130) and providing of previously stored data to the application hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored in the backup storages (120) includes backups of applications, such as virtual machines, hosted by the application hosts (130). For example, the application hosts (130) may host a virtual machine that hosts a database application. To generate backups of the database, a backup of the application hosting the database may be generated and the backup may be sent to the backup storages (120) for storage. At a future point in time, it may become desirable to restore the state of the database managed by the database application to a previous point in time. To do so, the previously stored backup of the virtual machine stored in the backup storages (120) may be retrieved. The retrieved backup may be used, alone or in combination with other backups, to restore the application data hosted by the virtual machine hosting the database to a state associated with the backup, i.e., the desired previous point in time.

In one or more embodiments of the invention, the data stored in the backup storages (120) includes backups of applications hosted by the application hosts (130). For example, at a future point in time, it may become desirable to quickly restore the state of the applications hosted by the application host to a previous point in time. To do so, a previously stored application backup, i.e., a backup that is usable to restore only a specific application to a previous point in time without restoring the application host that is hosting the application, may be utilized to selectively restore states of the applications to prior states associated with the application level backups.

While described above as storing backups of applications (e.g., an application backup), the backup storages (120) may store other types of data from the application hosts (130), or other entities, without departing from the invention.

In one or more embodiments of the invention, the backup management system (110) is implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup management system (110) described through this application and all, or a portion, of the methods illustrated in FIGS. 3-5. The backup management system (110) may be implemented using other types of computing devices without departing from the invention. For additional details regarding computing devices, refer to FIG. 8.

In one or more embodiments of the invention, the backup management system (110) is implemented using distributed computing devices. As used herein, a distributed computing device refers to functionality provided by a logical device that utilizes the computing resources of one or more separate and/or distinct computing devices. For example, in one or more embodiments of the invention, the backup management system (110) is implemented using distributed devices that include components distributed across any number of separate and/or distinct computing devices. In such a scenario, the functionality of the backup management system (110) may be performed by multiple different computing devices without departing from the invention.

In one or more embodiments of the invention, the backup management system (110) provides backup management and restoration services. Backup management and restoration services may include (i) providing information to the application hosts (130) regarding when unscheduled micro-backups should be generated, (ii) providing information to the backup storages (120) regarding the creation of restoration ready backups using a micro-backup and at least one previously generated scheduled backup, (iii) providing information to the backup storages (120) regarding the creation of application backups using a micro-backup and header data (e.g., the identifying information of a backup necessary for the backup management system (110) to utilize the backup for a restoration) of the last scheduled backup generated for the application host (iv) providing information to the backup storages (120) and the application hosts (130) regarding the restoration of an application host using a restoration ready backup, and (v) providing information to the backup storages (120) and the application hosts (130) regarding the restoration of an application hosted by an application host using an application backup.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, application hosts may host applications, such as virtual machines, database applications, electronic communication applications, file sharing applications, and/or other types of applications. FIG. 2.1 shows a diagram of an example application host (200) in accordance with one or more embodiments of the invention. The example application host (200) may be similar to any of the application hosts (130, FIG. 1). As discussed above, the example application host (200) may provide: (i) application services and (ii) backup services to the applications.

To provide the aforementioned functionality of the example application host (200), the example application host (200) may include applications (210), an operating system (220), an application host backup manager (230), and storage (240). Each component of the example application host (200) is discussed below.

The applications (210) may be executed using physical computing resources of the example application host (200) and/or other entities. In other words, each of the applications (210) may be implemented as computer instructions stored on a persistent storage that when executed by a processor of the example application host (200) and/or other entities give rise to the functionality of the respective applications (210). The applications may be database applications, a word processor, electronic communication applications, file sharing applications, and/or other types of applications. The example application host (200) may host any number of applications (e.g., 210.2, 210.4) without departing from the invention.

One or more of the applications (210) may be virtual machines that host application accessible by clients (140, FIG. 1) or other entities. For example, the virtual machines may host database applications, a word processor, electronic communication applications, file sharing applications, and/or other types of applications. Each of the virtual machines may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide services to a user of the application host. The provided services may correspond to the type of application of each of the applications. When providing application services to the user, data that is relevant to the user may be received by and/or generated by the applications. The applications may store such relevant data as part of application data associated with respective applications in storage (240) of the example application host (200) and/or other entities.

In some embodiments of the invention, portions, or all, of the application data may be stored remotely from the example application host (200). For example, the application data may be stored in a second application host, a backup storage, or another entity, that does not host the applications. In some cases, the application data may be spanned across multiple entities or multiple copies of the application data may be stored in multiple virtual machines to facilitate cooperative action by multiple instances of an application that are hosted by multiple virtual machines. The application data may be stored in other locations without departing from the invention.

In one or more embodiments of the invention, the application host operating system (220) is implemented using a computer program that may execute on the underlying hardware of the application host (200). Specifically, the application host operating system (220) may oversee application host (200) operations. To that extent, the application host operating system (220) may include functionality to, for example, support fundamental application host (200) functions; schedule tasks; mediate interactivity between logical (e.g., software) and physical (e.g., hardware) application host (200) components (e.g., by providing any number of layers of abstraction of the hardware such as, for example, via virtualization, containers, etc.); allocate application host (200) resources; and execute or invoke other computer programs executing on the application host (200). One of ordinary skill will appreciate that the application host operating system (220) may perform other functionalities without departing from the invention. For example, the application host operating system (220) may facilitate application (210.2, 210.4) interaction with data stored locally on the storage (240).

The application host backup manager (230) may provide backup services for the application host (210) or applications (210.2, 210.4) hosted by the application host. The backup services may include (i) obtaining information from the backup management system including when scheduled full backups and/or incremental backups should be generated, (ii) obtaining information from the backup management system including when micro-backups for the applications (210) should be generated, and (iii) storing the backups in backup storage for future use.

When providing its functionality, the application host backup manager (230) may utilize the storage (240) by storing data structures including information used by the application host backup manager (230) on the storage (240).

In one or more embodiments, the storage (240) is implemented using devices that provide data storage services (e.g., storing data and providing copies of previously stored data). The devices that provide data storage services may include hardware devices and/or logical devices. For example, storage (240) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (240) may include a memory device (e.g., a dual in line memory device) in which data is stored and from which copies of previously stored data are provided. In another example, storage (240) may include a persistent storage device (e.g., a solid state disk drive) in which data is stored and from which copies of previously stored data are provided. In a still further example, storage (240) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Figure 3:
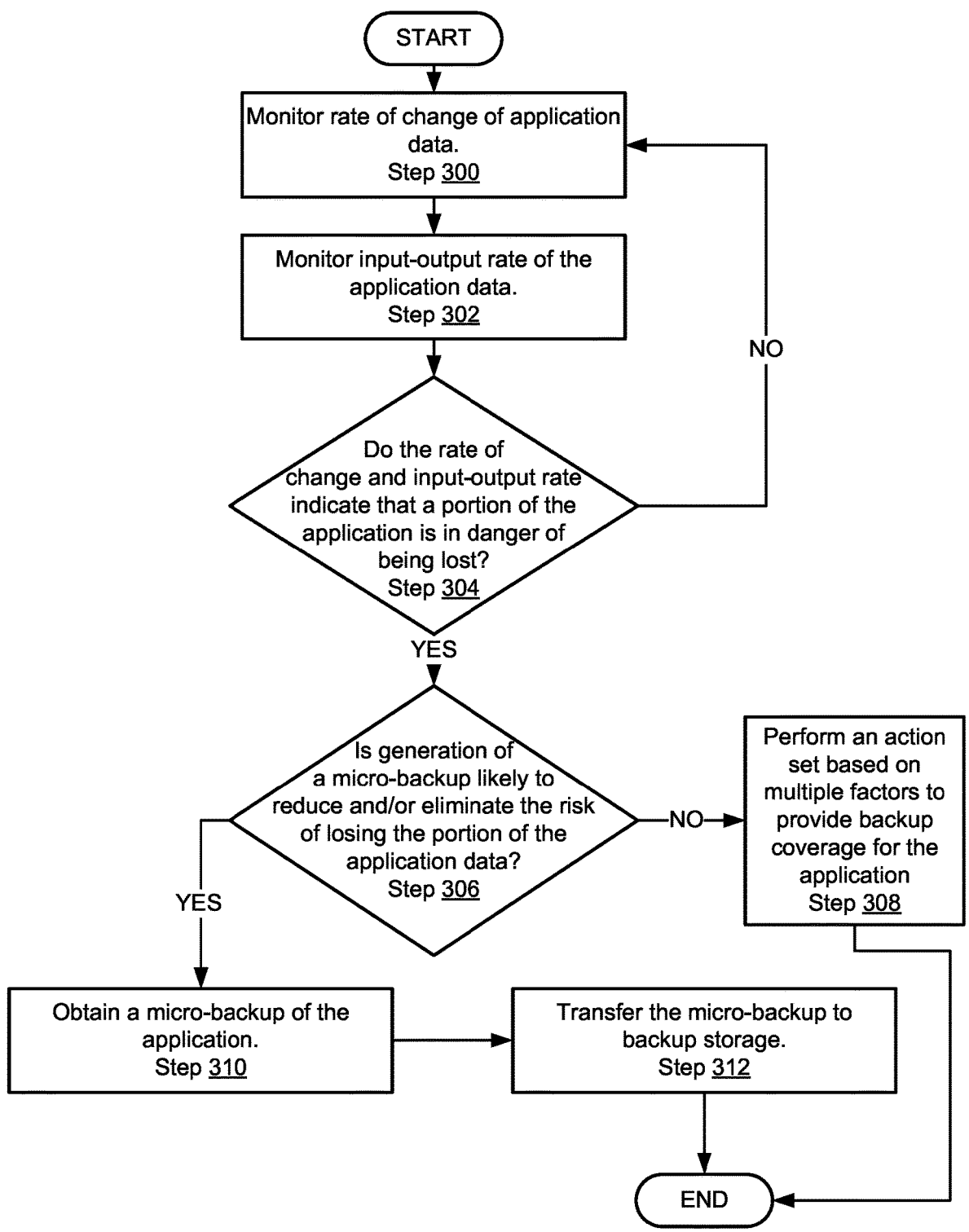
FIG. 3 shows a flowchart of a method of providing backup services in accordance with one or more embodiments of the invention.
Figure 4A:
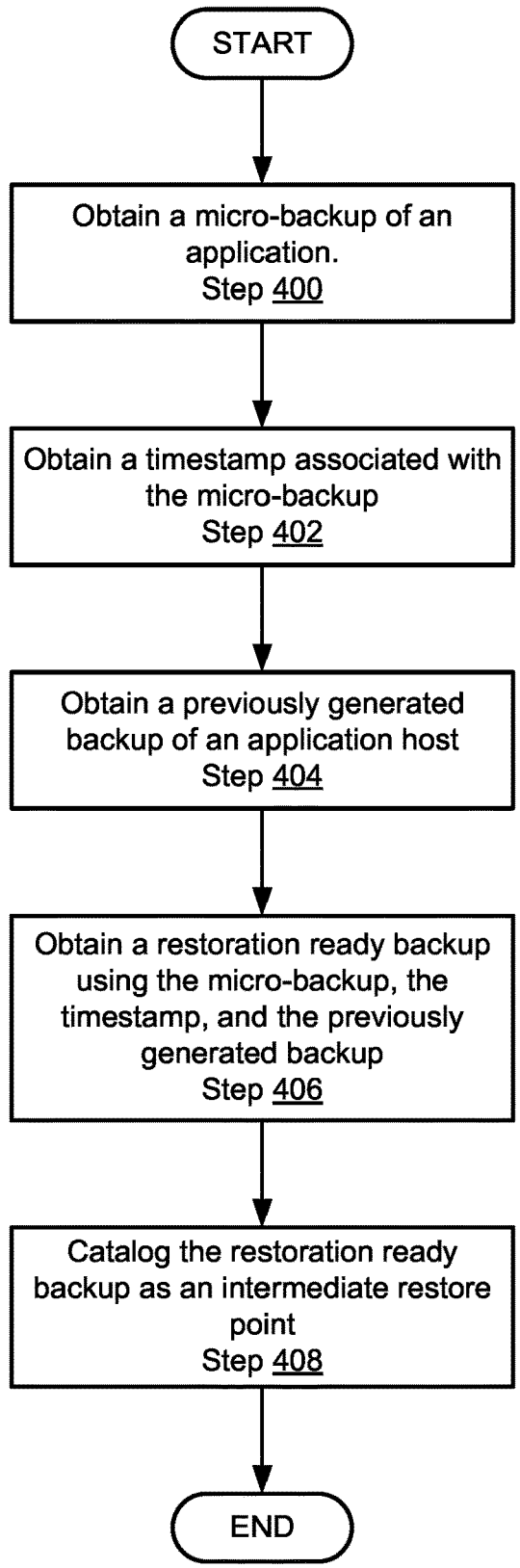
FIG. 4A shows a flowchart of a method of creating an intermediate restore point in accordance with one or more embodiments of the invention.
Figure 4B:
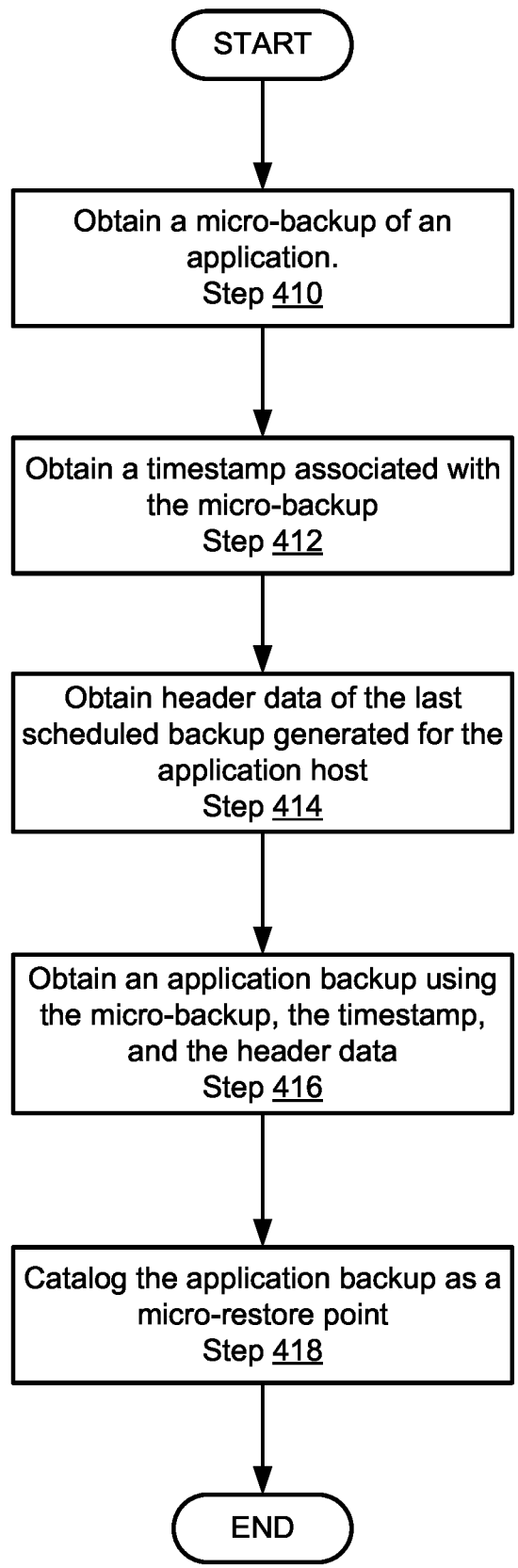
FIG. 4B shows a flowchart of a method of creating an intermediate restore point in accordance with one or more embodiments of the invention.
Figure 5:
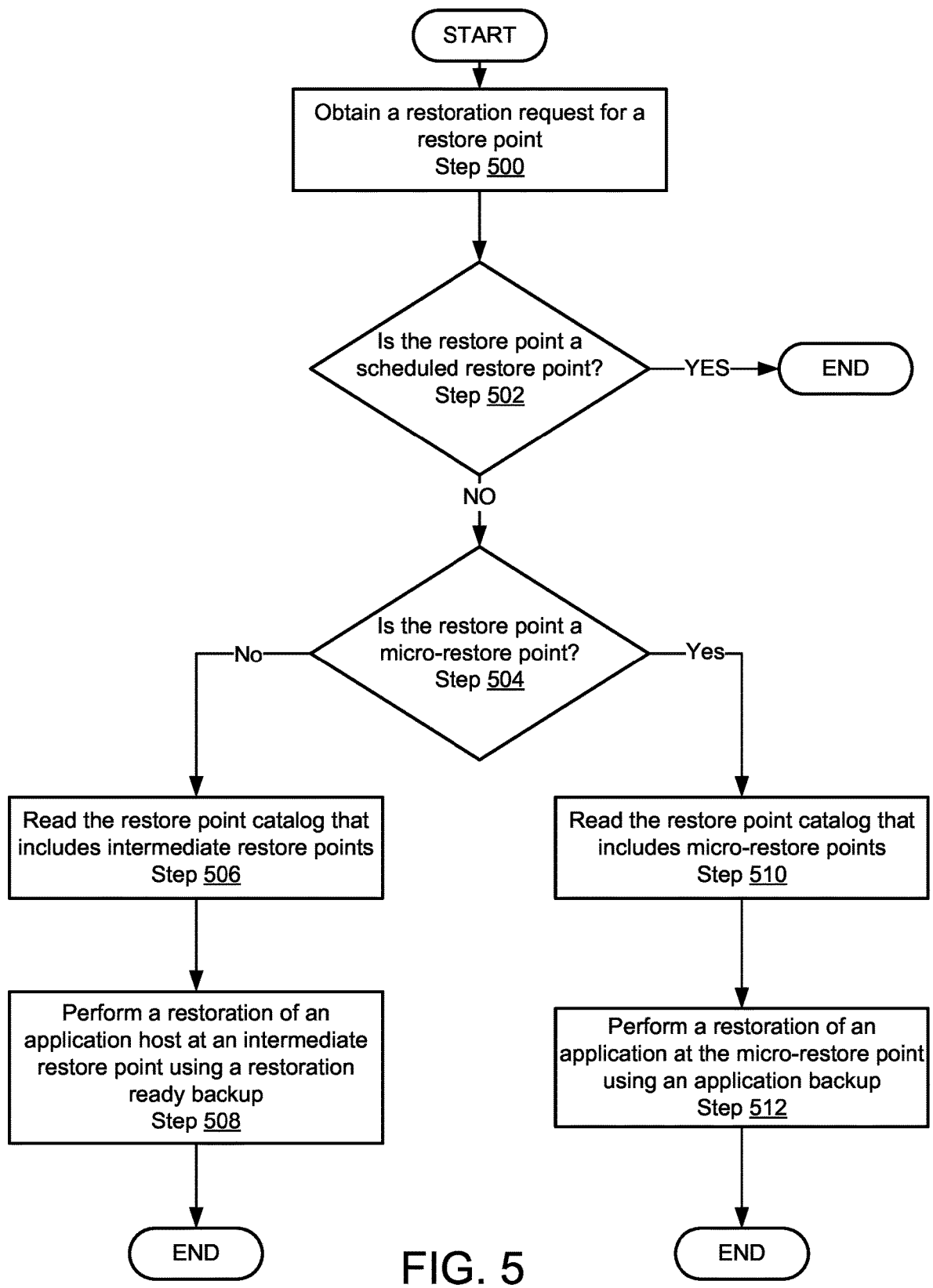
FIG. 5 shows a flowchart of a method of performing a restoration in accordance with one or more embodiments of the invention.

To provide the above noted functionality of the application host backup manager (230), the application host backup manager (230) may perform all, or a portion, of the methods illustrated in FIGS. 3-5.

In one or more embodiments of the invention, the application host backup manager (230) is implemented using a hardware device including circuitry. The application host backup manager (230) may be implemented using, for example, a digital signal processor, a field programmable gate array, or an application specific integrated circuit. The application host backup manager (230) may be implemented using other types of hardware devices without departing from the invention.

In one or more embodiments of the invention, the application host backup manager (230) is implemented using computing code stored on a persistent storage that when executed by a processor performs all, or a portion, of the functionality of the application host backup manager (230). The processor may be a hardware processor including circuitry such as, for example, a central processing unit or a microcontroller. The processor may be other types of hardware devices for processing digital information without departing from the invention.

While the example application host (200) of FIG. 2.1 has been described and illustrated as including a limited number of components for the sake of brevity, an application host (200) in accordance with embodiments of the invention may include additional, fewer, and/or different components than those illustrated in FIG. 2.1 without departing from the invention.

As discussed above, the backup management system (110) may provide, in part, data protection services to the application hosts (130). FIG. 2.2 shows a diagram of an example backup management system (242) in accordance with one or more embodiments of the invention. The example backup management system (242) may be similar to the backup management system (110, FIG. 1).

To provide the aforementioned functionality of the example backup management system (242), the example backup management system (242) may include backup manager (244) and storage (246). Each component of the example backup management system (242) is discussed below.

The backup manager (244) may provide backup services and restoration services for the application host (130, FIG. 1) and/or applications (130.2, 130.4, FIG. 1) hosted by the application host (130, FIG. 1). The backup services may include (i) providing information to the application host including when scheduled full backups and/or incremental backups should be generated and (ii) providing information to the application host including when micro-backups for the applications (210) should be generated. The restoration services may include (i) transferring copies of any number of backups (e.g., a full backup, an incremental backup, a restoration ready backup, and/or an application backup) to a an application host, and (ii) instantiating new copies of any number of entities on the applications on the application host, and (iii) restoring the operation of the newly instantiated applications using the transferred backups. To do so, the backup manager (244) may orchestrate the operation of any number of entities illustrated in FIG. 1 (e.g., instruct backup storages to send copies of backups, instruct an application host to instantiate applications, etc.). The backup manager (244) may orchestrate the operation of these entities using any command and control scheme including, for example, message passing, state sharing, publish-subscribe communications, etc.

When providing its functionality, the backup manager (244) may utilize the storage (246) by storing data structures including information used by the backup manager (244).

To provide the above noted functionality of the backup manager (244), the backup manager (244) may perform all, or a portion, of the methods illustrated in FIGS. 3-5.

In one or more embodiments of the invention, the backup manager (244) is implemented using a hardware device including circuitry. The backup manager (244) may be implemented using, for example, a digital signal processor, a field programmable gate array, or an application specific integrated circuit. The backup manager (244) may be implemented using other types of hardware devices without departing from the invention.

In one or more embodiments of the invention, the backup manager (244) is implemented using computing code stored on a persistent storage that when executed by a processor performs all, or a portion, of the functionality of the backup manager (244). The processor may be a hardware processor including circuitry such as, for example, a central processing unit or a microcontroller. The processor may be other types of hardware devices for processing digital information without departing from the invention.

In one or more embodiments, the storage (246) is implemented using devices that provide data storage services (e.g., storing data and providing copies of previously stored data). The devices that provide data storage services may include hardware devices and/or logical devices. For example, storage (246) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (246) may include a memory device (e.g., a dual in line memory device) in which data is stored and from which copies of previously stored data are provided. In another example, storage (246) may include a persistent storage device (e.g., a solid state disk drive) in which data is stored and from which copies of previously stored data are provided. In a still further example, storage (246) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (246) may store data structures including micro-backup thresholds (248), a backup schedule (250) for the application hosts, and a restore point catalog (252). Each of these data structures is discussed below.

Micro-backup thresholds (248) may be implemented using one or more data structures. The data structures may include information regarding when micro-backups for applications of an application host should be generated.

The information included in the micro-backup thresholds (248) may include, for example, threshold values that when met or exceeded trigger or prevent the generation of a micro-backup of an application. An example of a threshold value may be an I/O rate threshold, which is a minimum number of I/O operations associated with an application since the last scheduled backup was generated. For example, a micro-backup may be generated if a number of I/O operations associated with an application exceeds the I/O rate threshold. Another example of a threshold value may be a data change threshold, which is a minimum amount of application data that has changed since the last scheduled backup was generated. For example, a micro-backup may be generated if the amount of application data that has changed exceeds the data change threshold. A further example of a threshold value may be a time threshold, which is a required amount of time between starting micro-backup generation and a scheduled backup. For example, if the time required to generate a micro-backup exceeds the time threshold, generation of a micro-backup may be prevented. Other threshold values may be used without departing from the invention.

For example, consider a scenario in which multiple applications are reading information included in a database and a single application is writing data to the database. The rate at which data of the database is changing may be relatively low by virtue of only a single application writing data to the database. However, the I/O rate of the database may be large due to the multiple applications reading data stored in the database. In this scenario, the I/O threshold may indicate that the data included in the database is of high relative importance while the change rate threshold may indicate that only a small amount of data is likely to be lost. If this scenario occurs, generation of a micro-backup may be initiated because at least one of the thresholds has been met. Consequently, the thresholds may provide a more nuanced approach for initiating backup generations that take into account both importance of data and quantity of data at risk of loss.

The backup schedule (250) may be implemented using one or more data structures. The data structures may include information regarding when application hosts will generate a full backup or an incremental backup. For example, the backup schedule may be implemented by an application host backup manager, an administrator, or an actor in the system of FIG. 1 to create a full backup every six hours and create an incremental backup every two hours between full backups. Micro-backups of individual applications may be generated in between scheduled backups if one or more of the threshold values for generating a micro-backup are exceeded. The micro-backups store application data of the individual applications that would otherwise not be backed up until the next scheduled backup.

For example, consider a scenario in which a database hosted on an application host reaches an I/O rate threshold or a data change threshold 15 minutes before the next scheduled backup. In this scenario, generation of a micro-backup for the database may be initiated because at least one of the thresholds has been met. Consequently, the database may be backed up once the threshold is reached, resulting in a lower amount of data loss if a failure of the application host occurs prior to completing the next schedule backup. Generation of micro-backups based on thresholds may also allow an administrator to institute longer periods of time between scheduled backup while still meeting a required recovery time objective.

The restore point catalog (252) may be implemented using one or more data structures. The data structures may include information indicating points in time when various backups have been generated. For additional details regarding data structures of the restore point catalog (252), refer to FIG. 2.3.

FIG. 2.3 shows a diagram of the restore point catalog (252) in accordance with one or more embodiments of the invention. The restore point catalog (252) may store data structures including scheduled restore points (254), intermediate restore points (256), and micro-restore points (258). Each of these data structures is discussed below.

The restore point catalog (252) may include information usable to determine to which states entities of the system of FIG. 1 may be restored. The restore point catalog (252) may include information regarding backups that have been generated for various entities of the system of FIG. 1, the relationships between these backups (e.g., which backups may be used in combination with other backups), information regarding how to use various backups to perform restorations (e.g., how to combine backups to form desirable disk images associated with corresponding states/points in time), and/or other information usable to orchestrate the restoration of entities of FIG. 1.

The scheduled restore points (254) may be implemented using one or more data structures. The data structures may include information regarding the points in time that scheduled backups were generated. For example, a scheduled restore point (254) may be used to identify a point in time when a full backup or an incremental backup was generated and associate the point in time with the full backup or the incremental backup that was generated and stored in backup storage (120, FIG. 1).

The intermediate restore points (256) may be implemented using one or more data structures. The data structures may include information regarding the points in time that micro-backups were generated based on the micro-backup thresholds (248). For example, an intermediate restore point (e.g., 256) may be used to identify a point in time when a micro-backup utilized in a restoration ready backup, i.e., a backup generated by combining a micro-backup with a previously generated scheduled backup, was generated and associate the point in time with the restoration ready backup that was generated and stored in backup storage (120, FIG. 1).

The micro-restore points (258) may be implemented using one or more data structures. The data structures may include information regarding the points in time that micro-backups were generated based on the micro-backup thresholds (248). For example, a micro-restore point (e.g., 258) may be used to identify a point in time when a micro-backup utilized in creating an application backup, i.e., a backup created by combining a micro-backup with the header data from the last scheduled backup for the application host associated with the application for which a micro-backup is generated, was generated and associate the point in time with the application backup that was generated and stored in backup storage (120, FIG. 1).

While the data structures stored in storage (246) have been described as including a limited amount of specific information, any of the data structures stored in storage (246) may include additional, less, and/or different information without departing from the invention. Further, the aforementioned data structures may be combined, subdivided into any number of data structures, may be stored in other locations (e.g., in a storage hosted by another device), and/or spanned across any number devices without departing from the invention.

As discussed above, the backup storages (120) may store backups generated by the application hosts (130, FIG. 1). FIG. 2.4 shows a diagram of an example backup storage (260) in accordance with one or more embodiments of the invention. The example backup storage (260) may be similar to the backup storage (120, FIG. 1).

To provide the aforementioned functionality of the example backup storage (260), the example backup storage (260) may include a storage manager (262) and storage (264). Each component of the example backup storage (260) is discussed below.

The storage manager (262) may provide backup and/or restoration services for the application hosts (130, FIG. 1) or applications (130.2, 130.4, FIG. 1) hosted by the application host (130, FIG. 1). The backup services may include obtaining full backups, incremental backups, and/or micro-backups from the application hosts. The restoration services may include providing one or more backups of the application host or an application, for example a full backup, an incremental backup, a restoration ready backup, or an application backup to an application host upon receiving a restoration request.

When providing its functionality, the storage manager (262) may utilize the storage (264) by storing data structures including information used by the storage manager (262).

To provide the above noted functionality of the storage manager (262), the storage manager (262) may perform all, or a portion, of the methods illustrated in FIGS. 3-5.

In one or more embodiments of the invention, the storage manager (262) is implemented using a hardware device including circuitry. The storage manager (262) may be implemented using, for example, a digital signal processor, a field programmable gate array, or an application specific integrated circuit. The storage manager (262) may be implemented using other types of hardware devices without departing from the invention.

In one or more embodiments of the invention, the storage manager (262) is implemented using computing code stored on a persistent storage that when executed by a processor performs all, or a portion, of the functionality of the storage manager (262). The processor may be a hardware processor including circuitry such as, for example, a central processing unit or a microcontroller. The processor may be other types of hardware devices for processing digital information without departing from the invention.

In one or more embodiments, the storage (264) is implemented using devices that provide data storage services (e.g., storing data and providing copies of previously stored data). The devices that provide data storage services may include hardware devices and/or logical devices. For example, storage (264) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (264) may include a memory device (e.g., a dual in line memory device) in which data is stored and from which copies of previously stored data are provided. In another example, storage (264) may include a persistent storage device (e.g., a solid state disk drive) in which data is stored and from which copies of previously stored data are provided. In a still further example, storage (264) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (264) may store data structures including scheduled backups (266), micro-backups (268), restoration ready backups (270) and/or application backups (272). Each of these data structures is discussed below.

Scheduled backups (266) may be implemented using one or more data structures. The data structures may include full backups and/or incremental backups generated by application hosts according to a schedule.

Restoration ready backups (270) may be implemented using one or more data structures. In one or more embodiments, the data structures include restoration ready backups generated using micro-backups generated by application hosts that are combined with previously generated scheduled backups of the application hosts hosting the applications corresponding to the micro-backups. As a restoration ready backup is a combination of a micro-backup of an application and a previously generated scheduled backup of an application host that hosts the application, the restoration ready backup does not correspond to any actual states of the application host. Specifically, the restoration ready backup is a combination of two different states of the application host, e.g. a combination of a scheduled backup that is generated at a first point in time and a micro-backup that is generated at a second point in time that is after the first point in time. In one or more embodiments, the data structures include micro-backups and the metadata associated with a previously generated full backup or a previously generated incremental backup that are necessary to attach the micro-backup to the previously generated full backup or the previously generated incremental backup upon the storage manager receiving a restoration request.

Application backups (272) may be implemented using one or more data structures. The data structures may include application backups generated using micro-backups generated by application hosts and header data of a last generated full backup or a last generated incremental backup.

While the data structures stored in storage (264) have been described as including a limited amount of specific information, any of the data structures stored in storage (264) may include additional, less, and/or different information without departing from the invention. Further, the aforementioned data structures may be combined, subdivided into any number of data structures, may be stored in other locations (e.g., in a storage hosted by another device), and/or spanned across any number devices without departing from the invention.

Returning to FIG. 1, the system may provide backup services to application hosts. FIGS. 3-5 illustrate methods that may be performed by the system of FIG. 1 when providing backup services.

FIG. 3 shows a flowchart of a method in accordance with one or more embodiments of the invention. The method depicted in FIG. 3 may be used to provide backup services in accordance with one or more embodiments of the invention. The method shown in FIG. 3 may be performed by, for example, the backup management system (110, FIG. 1) or managers (e.g., 230, FIG. 2.1). Other components of the system illustrated in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a rate of change of application data of an application hosted by an application host is monitored.

In one or more embodiments, the rate of change of the application data is monitored by instructing an operating system or other entity that mediates access to the application data to monitor changes to the application data and report the monitored changes. For example, a watch, monitor, or other function of the operating system may be invoked. As these changes are provided by the operating system, statistical analysis may be performed to ascertain the rate of change of the application data over time.

In step 302, the I/O rate of the application data is monitored.

In one or more embodiments, the I/O rate of the application data is monitored by instructing an operating system or other entity that mediates access to the application data to monitor access (e.g., reads, writes, deletions, etc.) of the application data and report the monitored changes. For example, a watch, monitor, or other function of the operating system may be invoked. As access of the application data is provided by the operating system, statistical analysis may be performed to ascertain the I/O rate of the application data over time.

In step 304, it is determined whether the rate of change of application data and the I/O rate of application data indicate that a portion of the application is in danger of being lost.

In one or more embodiments of the invention, the determination is made by comparing the rate of change of application data and the I/O rate of application data may define ranges to threshold values. The threshold values may define ranges that indicate whether the portion of the application may be in danger of being lost. If these rates (e.g., change rate and/or I/O rate) fall within and/or outside of the defined ranges, then it may be determined that the portions of the application data are in danger of being lost.

The thresholds may define the ranges using any system (inclusion regions, exclusion regions, filters, etc.) without departing from the invention.

The portion may be an undesirably large portion and/or particularly important portion. For example, the rate of change of the application data and/or the I/O rate of the application data may be used to ascertain the amount of data that is subject to loss (e.g., due to a failure of the application host) and/or the relative importance of the portion of the data by virtue of its rate of utilization.

In one or more embodiments of the invention, the threshold values are stored in the micro-backup thresholds (e.g., 248) data structure.

While described with respect to a single application, the aforementioned analysis may be performed for any number of applications hosted by the application host.

If it is determined that the portion of the application data is in danger of being lost, then the method may proceed to step 306 via the YES path shown in FIG. 3. If it is determined that the portion of the application data is not in danger of being lost, then the method returns to step 300 via the NO path shown in FIG. 3.

In step 306, it is determined whether generation of a micro backup is likely to reduce and/or eliminate the risk of losing the portion of the application data (e.g., discussed in step 304).

In one or more embodiments of the invention, the determination is made by comparing the time period between when the micro backup generation would be initiated to when the next scheduled backup generation will begin to a threshold value. The threshold value may define range(s) that indicate whether initiating generation of a micro backup is likely to reduce and/or eliminate the risk of losing the portion of the application data. For example, if a scheduled backup is going to be generated in the near future, generation of a micro backup may not even complete prior to initiating generation of the scheduled backup. Consequently, the resulting micro backup may provide limited or no protection against the risk of losing the portion of the application data.

If the time period falls outside of the defined range(s), then it may be determined that initiating generation of a micro backup is unwarranted. The threshold may define the range(s) using any system (inclusion regions, exclusion regions, filters, etc.) without departing from the invention.

In one or more embodiments of the invention, the threshold values are stored in the micro-backup thresholds (e.g., 248) data structure.

If it is determined that generation of a micro backup is likely to reduce and/or eliminate the risk of losing the portion of the application data, the method may proceed to step 308 via the NO path shown in FIG. 3. If it is determined that generation of a micro backup is unlikely to reduce and/or eliminate the risk of losing the portion of the application data, the method proceeds to step 310 via the YES path shown in FIG. 3.

In step 308, an action set is performed based on multiple factors to provide backup coverage for the application. Because a micro-backup is not being generated by virtue of following the NO path following step 306, a significant portion of application may still be subject to loss due to a failure of an application host. To reduce the likelihood of losing the portion of the data, the action set may be performed. The specific actions included in the action set may depend based on numerous factors.

In one or more embodiments, the factors include the priority of the application (with respect to other applications and/or entities of the system of FIG. 1 for which limited resources may be available for generating backups), the available computing resources for generating a backup, the function of the application within a system architecture, the period of time until the next scheduled backup for the application host will be generated, etc. Other factors may be considered in addition to and/or in place of the aforementioned factors.

In one or more embodiments, the action set includes actions such as not generating a micro-backup because a scheduled full backup or a scheduled incremental backup is going to be generated, modifying a scheduled backup to exclude data from the application, or adjusting the backup schedule to generate a full backup or an incremental backup at an earlier time. Other actions may be taken in addition to and/or in place of the aforementioned actions.

The method may end following step 308.

Returning to step 306, the method may proceed to step 310 following step 306 if generation of a micro-backup is likely to reduce and/or eliminate the threat of loss of the portion of the application data.

In step 310, a micro-backup of the application is obtained.

In one or more embodiments, the micro-backup of the application is generated by the application host backup manager (230, FIG. 2.1), as described above. In other embodiments, the micro-backup of the application may be generated by another manager (e.g., 244, FIG. 2.2) by instructing or otherwise causing the application host backup manager (230, FIG. 2.1) to generate the backup.

In step 312, the micro-backup is transferred to backup storage.

The micro-backup may be transferred to the backup storages (120, FIG. 1) by sending a copy of it (and/or other data structures derived from the micro-backup) to the backup storages (120, FIG. 1) via one or more networks (or other communications medium).

In one or more embodiments, the transfer of the micro-backup is initiated by the application host backup manager (230, FIG. 2.1). In other embodiments, the transfer may be initiated by another manager (e.g., 262, FIG. 2.4).

FIG. 4A shows a flowchart of a method in accordance with one or more embodiments of the invention. The method depicted in FIG. 4A may be used to create an intermediate restore point. The method shown in FIG. 4A may be performed by, for example, managers (e.g., 244, FIG. 2.2). Other components of the system illustrated in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a micro-backup of an application is obtained.

In one or more embodiments of the invention, the micro-backup of the application is generated by the application host backup manager (230, FIG. 2.1), as described above with reference to FIG. 3 and transferred to the backup storages (120, FIG. 1) by sending a copy of it (and/or other data structures derived from the backup) to the backup storages (120, FIG. 1) via one or more networks (or other communications medium). In other embodiments, the micro-backup of the application may be generated and/or the transfer may be initiated by another manager (e.g., 244, FIG. 2.2) by instructing or otherwise causing the application host backup manager (230, FIG. 2.1) to generate and/or transfer the micro-backup The micro-backup may reflect, i.e., track and store, changes made to application data of the application over a period of time from when a last scheduled backup was generated and a number of changes to the application data exceeded a predetermined number. The generation of the micro-backup may not be scheduled.

In one or more embodiments, the micro-backup is obtained using the method discussed above with respect to FIG. 3.

In step 402, a timestamp associated with the micro-backup is obtained.

In one or more embodiments, the timestamp associated with the micro-backup is generated by the application host backup manager (230, FIG. 2.1) at the same time that the application host backup manager (230, FIG. 2.1) generates the associated micro-backup. The timestamp may be transferred to the backup storages (120, FIG. 1) along with the micro-backup, as described above. In other embodiments, the timestamp may be generated and/or the transfer may be initiated by another manager (e.g., 244, FIG. 2.2) by instructing or otherwise causing the application host backup manager (230, FIG. 2.1) to generate the micro-backup and/or the associated timestamp. The time stamp may delineate an end of a period of time from when the last scheduled backup was generated.

In step 404, a previously generated backup of an application host is obtained.

In one or more embodiments, the previously generated backup is a scheduled full backup or a scheduled incremental backup generated by the application host backup manager (230, FIG. 2.1) according to a schedule (e.g., 250, FIG. 2.2) and transferred to the backup storages (120, FIG. 1) by sending a copy of it (and/or other data structures derived from the backup) to the backup storages (120, FIG. 1) via one or more networks (or other communications medium). In other embodiments, the previously generated backup of the application host may be generated and/or the transfer may be initiated by another manager (e.g., 244, FIG. 2.2) by instructing or otherwise causing the application host backup manager (230, FIG. 2.1) to generate and/or transfer the backup.

In step 406, a restoration ready backup is obtained using the micro-backup, the timestamp, and the previously generated backup.

In one or more embodiments, the restoration ready backup is generated by the storage manager (262, FIG. 2.4) by combining the micro-backup, the time stamp associated with the micro-backup (thereby associating the time stamp with the restoration ready backup), and the previously generated backup stored on the backup storages (120, FIG. 1). In other embodiments, the restoration ready backup of the application may be generated by another manager (e.g., 244, FIG. 2.2) by instructing or otherwise causing the storage manager (262, FIG. 2.4) to generate the restoration ready backup.

In one or more embodiments, the restoration ready backup reflects a state of the application host that never existed. Rather, the restoration ready backup may reflect a state of the application host at a first point in time (e.g., when the previously generated backup was generated) and a state of the application at a second point in time (e.g., when the micro-backup was generated). Consequently, the restoration ready backup, in contrast to a scheduled or micro-backup, may not be associated with any real point in time. For restoration purposes, the restoration ready backup may be treated as reflecting the state of the application host at the point in time associated with the micro-backup (even though the restoration ready backup does not include all of the data necessary to recover all of the data of the application host at the point in time). Consequently, when a restoration ready backup is used to perform a restoration, the resulting restoration may faithfully restore all of the data of the application thereby placing it into the state associated with the point in time for which it was generated while unfaithfully restoring the data of other entities of the application host. For example, other applications restored using the restoration ready backup may not have access to all of the data necessary for them to operate in accordance with their respective states at the alleged point in time of the restoration.

In step 408, the restoration ready backup is cataloged as an intermediate restore point.

In one or more embodiments of the invention, the restoration ready backup is cataloged as an intermediate restore point by adding new information to and/or modifying existing information stored in a restore point catalog (252, FIG. 2.2). The information may indicate (i) the presence of the restoration ready backup in backup storage (260, FIG. 2.4), (ii) how the restoration ready backup may be utilized for restoration purposes, (iii) any number of relationships between the restoration ready backup and other backups that may be used to ascertain in which combinations the backups may be usable to perform a restoration, and/or (iv) information regarding the restoration ready backup such as, for example, to which state an application host may be restored using the restoration ready backup (e.g., as defined by generation times of the backup(s) used to generate the restoration ready backup). The information may include additional, different, and/or less information without departing from the invention.

Thus, via the methods illustrated in FIGS. 3 and 4A one or more embodiments of the invention may facilitate the generation of an intermediate restore point. The intermediate restore point allows for restoration of an application host to a point in time associated with a scheduled backup, while restoring a specific application to a point in time after the scheduled backup was generated, thereby restoring application data that would have otherwise been lost. Accordingly, the experience of users of the system of FIG. 1 may be improved.

FIG. 4B shows a flowchart of a method in accordance with one or more embodiments of the invention. The method depicted in FIG. 4B may be used to create a micro-restore point. The method shown in FIG. 4B may be performed by, for example, managers (e.g., 244, FIG. 2.2). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 410, a micro-backup of an application is obtained.

In one or more embodiments, the micro-backup of the application is obtained by receiving it from another entity. For example, an application host (200, FIG. 2.1) or other entity may generate the micro-backup and provide the micro-backup of the application to the backup storage (260, FIG. 2.4). The micro-backup may be obtained by receiving it as part of a network communication or other communication medium. In one or more embodiments, the micro-backup of the application is obtained by receiving it via inter-process communication, shared memory, or an internal process (e.g., if the micro-backup is generated by the backup storage (260, FIG. 2.4)). The micro-backup may reflect, i.e., track and store, changes made to application data of the application over a period of time from when a last scheduled backup was generated and a number of changes to the application data exceeded a predetermined number, wherein generation of the micro-backup was not scheduled.

In step 412, a timestamp associated with the micro-backup is obtained.

In one or more embodiments, the timestamp is obtained by receiving it from another entity. For example, an application host or other entity may provide the time stamp to the backup storage (260, FIG. 2.4) (e.g., as part of the process of providing the micro-backup). The time stamp may be obtained by receiving it as part of a network communication or other communication medium. In one or more embodiments, the time stamp is obtained by receiving it via inter-process communication, shared memory, or an internal process (e.g., if the micro-backup is generated by the backup storage).

In step 414, the header data of the last scheduled backup generated for an application host is obtained.

In one or more embodiments, the header data is obtained from the last scheduled backup which is stored in the backup storage (260, FIG. 2.4). The header data may be a portion of the last scheduled backup or may be an independent data structure. The portion of the last scheduled backup or independent data structure may be obtained by reading it into memory.

In step 416, an application backup is obtained using the micro-backup, the timestamp, and the header data.

In one or more embodiments, the application backup is obtained by the storage manager (262, FIG. 2.4) by combining the micro-backup, the time stamp associated with the micro-backup, and the header data of the last generated backup stored on the backup storages (120, FIG. 1). Corresponding metadata usable to read the contents of the now-generated application backup may also be generated. In other embodiments, the application backup of the application may be generated by another manager (e.g., 244, FIG. 2.2) by instructing or otherwise causing the storage manager (262, FIG. 2.4) to generate the application backup. The application backup may be usable to restore the application to a state associated with the end of the period of time.

In step 418, the application backup is cataloged as a micro-restore point.

In one or more embodiments of the invention, the application backup is cataloged as a micro-restore point by adding new information to and/or modifying existing information stored in a restore point catalog (252, FIG. 2.2). The information may indicate (i) the presence of the application backup in backup storage, (ii) how the application backup may be utilized for restoration purposes, (iii) any number of relationships between the application backup and other backups that may be used to ascertain in which combinations the backups may be usable to perform a restoration, and/or (iv) information regarding the application backup such as, for example, to which state an application may be restored using the application backup (e.g., as defined by generation times of the backup(s) used to generate the application backup). The information may include additional, different, and/or less information without departing from the invention.

Thus, via the methods illustrated in FIGS. 3 and 4B one or more embodiments of the invention may facilitate the generation of a micro-restore point. The micro-restore point allows for restoration of only a specific application to a point in time. Therefore, the time involved in restoring the application is decreased since the application host is not restored as well. Accordingly, the experience of users of the system of FIG. 1 may be improved.

FIG. 5 shows a flowchart of a method in accordance with one or more embodiments of the invention. The method depicted in FIG. 3 may be used to provide backup services in accordance with one or more embodiments of the invention. The method shown in FIG. 3 may be performed by, for example, the backup management system backup (110, FIG. 1) or managers (e.g., 230, FIG. 2.1). Other components of the system illustrated in FIG. 1 may perform all, or a portion, of the method of FIG. 3 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a restoration request for a restore point is obtained.

In one or more embodiments, an administrator or a user generates the restoration request using a computing device and transmits the restoration request via one or more networks (or other communications medium) to the backup manager (244, FIG. 2.2), either directly or through an intermediary, such as another manger (e.g., 230, FIG. 2.1).

In step 502, it is determined whether the restore point is a scheduled restore point.

In one or more embodiments of the invention, the determination of whether the restore point is a scheduled restore point is made by the backup manager (244, FIG. 2.2) by comparing the requested restore point with the with scheduled restore points (254, FIG. 2.3) of the restore point catalog (252, FIG. 2.2). For example, the backup manager (244, FIG. 2.2) may determine that requested restore point matches one of the scheduled restore points (254, FIG. 2.3) and, therefore, the requested restore point is a scheduled restore point. In other embodiments, the determination may be initiated by another manager (e.g., 230, FIG. 2.1) by instructing or otherwise causing the backup manager (244, FIG. 2.2) to make the determination.

If it is determined that the restore point is a scheduled restore point, the method may end via the YES path shown in FIG. 5. If it is determined that the restore point is not a scheduled restore point, the method proceed to step 504 via the NO path shown in FIG. 5.

In step 504, it is determined whether the restore point is a micro-restore point.

In one or more embodiments of the invention, the determination of whether the restore point is a scheduled restore point is made by the backup manager (244, FIG. 2.2) by comparing the requested restore point with intermediate restore points (256, FIG. 2.3) of the restore point catalog (252, FIG. 2.2). For example, the backup manager (244, FIG. 2.2) may determine that requested restore point matches one of the intermediate restore points (256, FIG. 2.3) and, therefore, the requested restore point is an intermediate restore point. In other embodiments, the determination may be initiated by another manager (e.g., 230, FIG. 2.1) by instructing or otherwise causing the backup manager (244, FIG. 2.2) to make the determination.

If it is determined that the restore point is a not micro-restore point, then the method may proceed to step 506 via the NO path shown in FIG. 5. If it is determined that the restore point is a micro-restore point, the method proceed to step 510 via the YES path shown in FIG. 5.

In step 506, the restore point catalog that includes intermediate restore points is read.

In one or more embodiments, the restore point catalog (252, FIG. 2.2) is obtained from the backup management system storage (246, FIG. 2.2). The restore point catalog (252, FIG. 2.2) may be obtained by reading it into memory. Once the restore point catalog (252, FIG. 2.2) is read into memory, the requested restore point is matched to an intermediate restore point within the intermediate restore points (256, FIG. 2.3) to determine which restoration ready backup should be used when performing the requested restoration.

In step 508, a restoration of an application host at an intermediate restore point is performed using a restoration ready backup.

In one or more embodiments, the application host is restored by (i) transferring the restoration ready backup to the application host or another entity, (ii) instantiating one or more applications on the application host or another entity, and (iii) directing at least one of the applications to utilize all, or a portion, of the restoration ready backup in its operation. For example, the restoration ready backup may be utilized to instantiate a volume that includes application data. The at least one application may be directed to utilize this application data in its operation. The state of the application data may be matched to the state indicated by the restoration request obtained in step 500.

The method may end following step 508.

Returning to step 504, the method may proceed to step 510 via the YES path shown in FIG. 5 if the restore point is a micro-restore point.

In step 510, the restore point catalog that includes micro-restore points is read.

In one or more embodiments, the restore point catalog (252, FIG. 2.2) is obtained from the backup management system storage (246, FIG. 2.2). The restore point catalog (252, FIG. 2.2) may be obtained by reading it into memory. Once the restore point catalog (252, FIG. 2.2) is read into memory, the requested restore point is matched to a micro-restore point within the micro-restore points (258, FIG. 2.3) to determine which application backup should be used when performing the requested restoration.

In step 512, a restoration of an application at a micro-restore point is performed using a restoration ready backup.

In one or more embodiments, the application is restored by (i) transferring the application backup to the application host or another entity, (ii) instantiating an application on the application host or another entity, and (iii) directing the application to utilize all, or a portion, of the application backup in its operation. For example, the application backup may be utilized to instantiate a volume that includes application data. The application may be directed to utilize this application data in its operation. The state of the application data may be matched to the state indicated by the restoration request obtained in step 500.

The method may end following step 512.

Thus, via the method illustrated in FIG. 5 one or more embodiments of the invention may facilitate restoration using a micro-restore point or an intermediate restore point. The micro-restore point allows for restoration of only a specific application to a point in time. Therefore, the time involved in restoring the application is decreased since the application host is not restored as well. The intermediate restore point allows for restoration of an application host to a point in time associated with a scheduled backup, while restoring a specific application to a point in time after the scheduled backup was generated, thereby restoring application data that would have otherwise been lost. Accordingly, the experience of users of the system of FIG. 1 may be improved.

Figure 6:
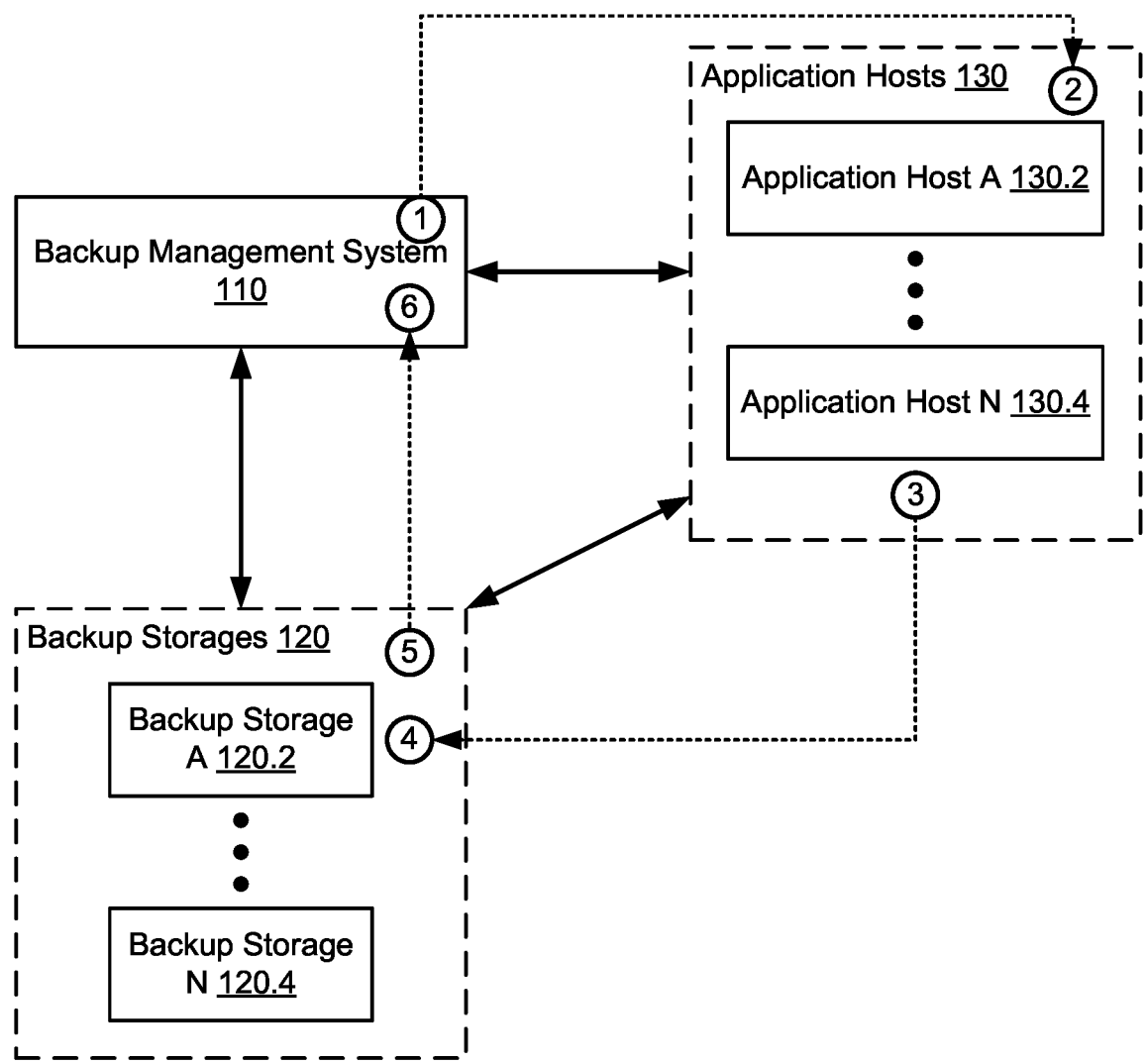
FIG. 6 shows a diagram of a non-limiting example of a system in accordance with embodiments of the invention.

To further clarify embodiments of the invention, a non-limiting example is provided in FIG. 6. FIG. 6 shows a diagram of an example system similar to that of FIG. 1.

Example

Consider a scenario as illustrated in FIG. 6 in which a backup management system (110), at step 1, provides information to the application hosts (130) that enables the application hosts (130) to independently generate scheduled backups and unscheduled micro-backups. The information may include a backup schedule of when the application hosts (130) are to generate a full backup and/or an incremental backup. The information may also include metrics for ascertaining whether a significant amount of data is at risk for loss even though scheduled backups have been generated. The metrics may include threshold values that define one or more ranges that indicate that significant amount of data are at risk and this risk should be actively mitigated. To mitigate the risk, the application hosts (130) may automatically initiate the generation of a micro-backup. Such thresholds may include an application data I/O rate threshold and an application data rate of change threshold.

The backup management system (110) also provides information to the backup storages (120) that enables the backup storages (120) to create an application backup upon receipt of a micro-backup and an associated timestamp (or other indicator of the state to which the micro-backup may be used to restore and application).

At step 2, each of the application hosts (130) monitor applications hosted by the respective application hosts (130.2, 130.4) to determine if application data of any applications exceeds the application data I/O rate threshold and the application data rate of change threshold.

At step 3, it is determined that an application hosted by an application host (130.2) has exceeded the application data I/O rate threshold and the application data rate of change threshold. As a result, the application host (130.2) generates a micro-backup of the application data. The application host (130.2) then transfers the micro-backup and the associated timestamp to the backup storages (120).

The application hosts 130 also generate full backups and/or incremental backups based on the backup schedule and transfer the full backups and/or the incremental backups, along with their header data, to the backup storages (120).

At step 4, the backup storages (120) receives the full backups and/or the incremental backups and their header data, as well as the micro-backup and the associated timestamp from the application host (130.2). The backup storage also stores the full backups and/or the incremental backups and their header data.

At step 5, the backup storages (120) creates an application backup using the micro-backup, the timestamp associated with the micro-backup, and header data from the last scheduled full backup or incremental backup of the application host and stores the application backup.

At step 6, the backup management system (120) receives data associated with the application backup and catalogs the application backup as a micro-restore point at the point in time associated with the timestamp of the micro-backup.

End of Example

Figure 7:
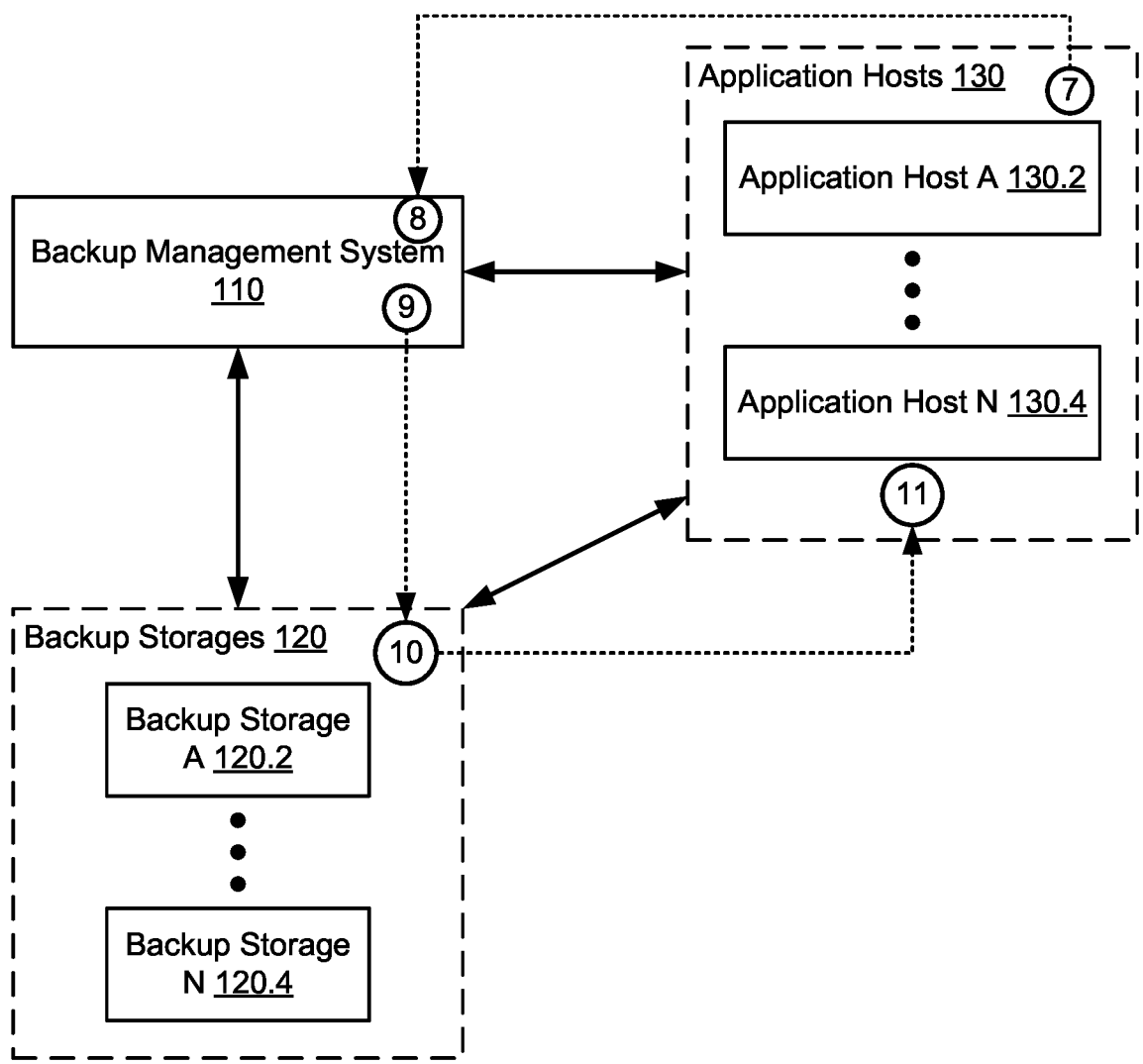
FIG. 7 shows a diagram of a non-limiting example of a system in accordance with embodiments of the invention.

To further clarify embodiments of the invention, a non-limiting example is provided in FIG. 7. FIG. 7 shows a diagram of an example system similar to that of FIG. 1.

Example

Consider a scenario as illustrated in FIG. 7 in which an application host (130.2), at step 7, generates a restoration request for a restore point and transmits the restoration request to the backup management system.

At step 8, the backup management system (110) determines that the restore point is not a scheduled restore point. The backup management system (110) then reads the restore point catalog that includes restore points that are not associated with a scheduled backup. The backup management system (110) then determines that the restore point is an intermediate restore point.

At step 9, the backup management system (110) transmits information to the backup storages (120) that enables the backup storage to identify the restoration ready backup associated with the intermediate restore point. The information also enables the backup storage to identify the application host (130.2) that generated the restoration request.

At step 10, the backup storages (120) receives the information from the backup management system. The backup storages (120) then transmits the restoration ready backup to the application host (130.2) that generated the restoration request.

At step 11, the application host utilizes the restoration ready backup to restore the application host to an earlier point in time associated with a previously generated scheduled backup used to generate the restoration ready backup, while also restoring an application associated with the micro-backup used to generate the restoration ready backup to a point in time when the micro-backup was generated.

End of Example

Any of the components of FIG. 1 may be implemented using distributed computing devices. As used herein, a distributed computing device refers to functionality provided by a logical device that utilizes the computing resources of one or more separate and/or distinct computing devices.

Figure 8:
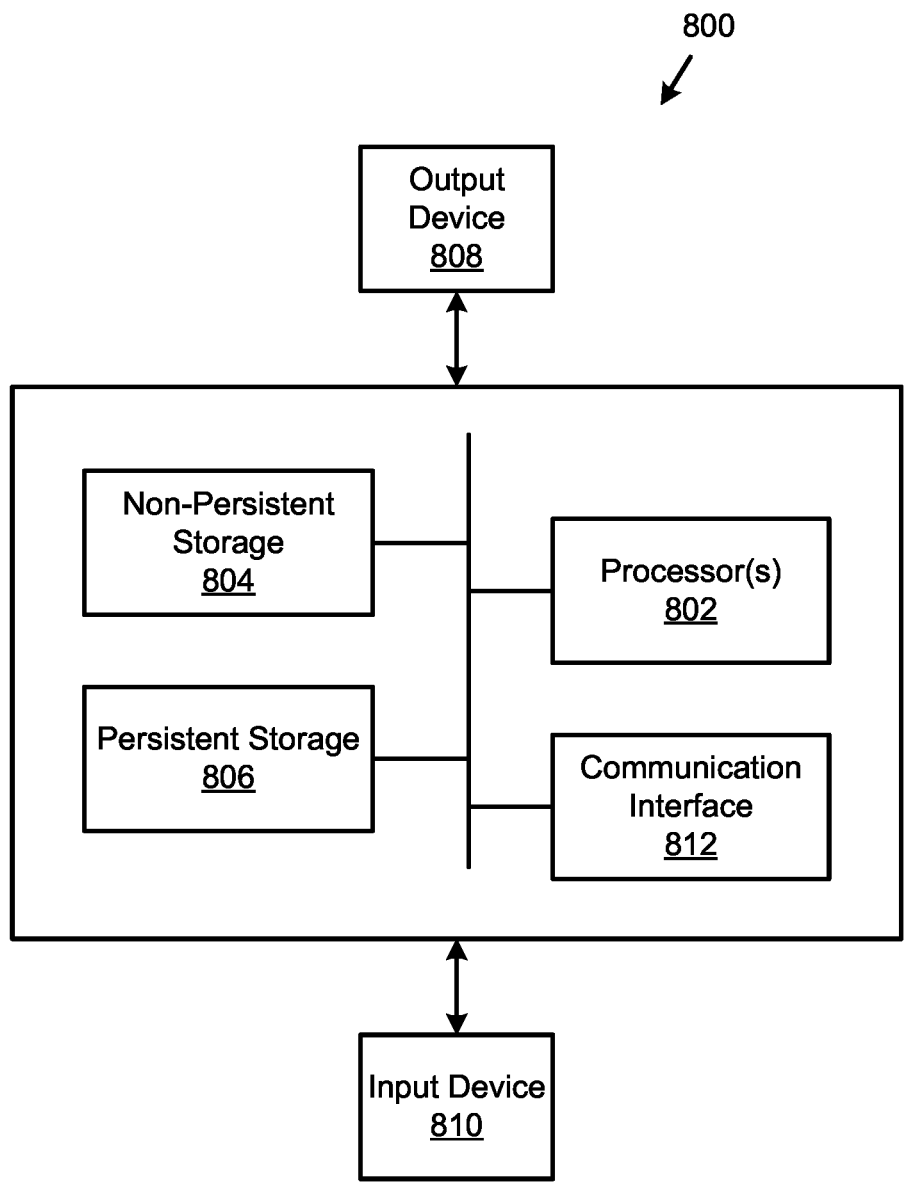
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one or more embodiments of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one or more embodiments of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Additionally, by enabling backup generation to be performed independently from a schedule, the total number of backups necessary to provide a desired level of data protection may be reduced. For example, by allowing backups to be unscheduled (e.g., generated in response to the occurrence of conditions rather than at predetermined times), generation of backups that only impact a small amount of data may be avoided. Consequently, the quality of services provided by a system in accordance with embodiments of the invention may be improved by reducing the quantity of computationally costly backup generation performed by the system.

Thus, embodiments of the invention may address the problem of the limited availability of computational resources in a distributed system that relies on data redundancy for data protection purposes. Specifically, embodiments of the invention may provide a method of reducing the number of backups that are generated while still meeting data protection goals.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the invention as disclosed herein. Accordingly, the scope of the invention should be limited only by the attached claims.

What is claimed is:

1. A backup management system for providing data integrity services to an application host that hosts an application having application data, comprising:
storage for storing threshold values for creating an application backup; and
a processor programmed to:
monitor:
a rate of change of the application data, and
an input-output rate of the application data;
make a determination, based on the threshold values, the rate of change, and the input-output rate, that an unscheduled backup for the application is to be generated;
obtain a micro-backup for the application in response to the determination; and
obtain a restoration ready backup for the application using the micro-backup and at least one previously generated backup.

2. The backup management system of claim 1, wherein making the determination, based on the threshold values, the rate of change, and the input-output rate, that the unscheduled backup for the application is to be generated comprises making a second determination that the rate of change has exceeded a rate of change threshold value of the threshold values and that the input-output rate has exceeded an input-output rate threshold of the threshold values.

3. The backup management system of claim 1, wherein obtaining the restoration ready backup for the application using the micro-backup and the at least one previously generated backup comprises:
obtaining the at least one previously generated backup; and
combining the micro-backup and the at least one previously generated backup,
wherein the at least one previously generated backup is a scheduled backup,
wherein the at least one previously generated backup reflects a state of the application host at a first point in time,
wherein the micro-backup reflects a state of the application at a second point in time,
wherein the restoration ready backup reflects a synthetic state of the application host that never existed.

4. The backup management system of claim 1, wherein the processor is further programmed to obtain a timestamp associated with the micro-backup, wherein the timestamp indicates a state of the application reflected by the micro-backup.

5. The backup management system of claim 4, wherein:
the storage is further for storing a restore point catalog; and
the processor is further programmed to catalog the restoration ready backup as an intermediate restore point in the restore point catalog based on the timestamp while the restoration ready backup does not reflect the state of the application host indicated by the timestamp,
wherein the intermediate restore point indicates that the application host may be restored to the state indicated by the timestamp using the restoration ready backup.

6. The backup management system of claim 5, wherein the processor is further programmed to:
obtain a restoration request for restoration of the application host to the state indicated by the timestamp;
make an identification that the restoration ready backup may be used to perform a restoration that satisfies the restoration request by reading the restore point catalog for the intermediate restore point based on the restoration request; and
perform the restoration of the application host using the restoration ready backup based on the identification.

7. The backup management system of claim 6, wherein:
the processor is further programmed to make a determination that the restoration request is for a restoration at the intermediate restore point; and
reading the restore point catalog for the intermediate restore point based on the restoration request comprises reading the restore point catalog for the intermediate restore point based on the restoration request and the determination that the restoration request is for a restoration at the intermediate restore point.

8. A method for providing backup services to an application host that hosts an application that uses application data, comprising:
monitoring:
a rate of change associated with the application data, and
an input-output rate of the application data;
making a determination, based on threshold values, the rate of change, and the input-output rate, that an unscheduled backup for the application is to be generated;
obtaining a micro-backup for the application in response to the determination; and
obtaining a restoration ready backup for the application using the micro-backup and at least one previously generated backup.

9. The method of claim 8, wherein making the determination, based on the threshold values, the rate of change, and the input-output rate, that the unscheduled backup for the application is to be generated comprises making a second determination that the rate of change has exceeded a rate of change threshold value of the threshold values and that the input-output rate has exceeded an input-output rate threshold of the threshold values.

10. The method of claim 8, wherein obtaining the restoration ready backup for the application using the micro-backup and the at least one previously generated backup comprises:
obtaining the at least one previously generated backup; and
combining the micro-backup and the at least one previously generated backup,
wherein the at least one previously generated backup is a scheduled backup,
wherein the at least one previously generated backup reflects a state of the application host at a first point in time,
wherein the micro-backup reflects a state of the application at a second point in time,
wherein the restoration ready backup reflects a synthetic state of the application host that never existed.

11. The method of claim 8, further comprising obtaining a timestamp associated with the micro-backup, wherein the timestamp indicates a state of the application reflected by the micro-backup.

12. The method of claim 11, further comprising cataloging the restoration ready backup as an intermediate restore point in a restore point catalog based on the timestamp while the restoration ready backup does not reflect the state of the application host indicated by the timestamp, wherein the intermediate restore point indicates that the application host may be restored to the state indicated by the timestamp using the restoration ready backup.

13. The method of claim 12, further comprising:
obtaining a restoration request for restoration of the application host to the state indicated by the timestamp;
making an identification that the restoration ready backup may be used to perform a restoration that satisfies the restoration request by reading the restore point catalog for the intermediate restore point based on the restoration request; and
performing the restoration of the application host using the restoration ready backup based on the identification.

14. The method of claim 13, further comprising making a determination that the restoration request is for a restoration at the intermediate restore point, wherein reading the restore point catalog for the intermediate restore point based on the restoration request comprises reading the restore point catalog for the intermediate restore point based on the restoration request and the determination that the restoration request is for a restoration at the intermediate restore point.

15. A non-transitory computer readable medium comprising computer readable program code, which when executed by a computer processor enables the computer processor to perform a method for providing backup services to an application host that hosts an application that uses application data, the method comprising:
monitoring:
a rate of change associated with the application data, and
an input-output rate of the application data;
making a determination, based on threshold values, the rate of change, and the input-output rate, that an unscheduled backup for the application is to be generated;
obtaining a micro-backup for the application in response to the determination; and
obtaining a restoration ready backup for the application using the micro-backup and at least one previously generated backup.

16. The non-transitory computer readable medium of claim 15, wherein making the determination, based on the threshold values, the rate of change, and the input-output rate, that the unscheduled backup for the application is to be generated comprises making a second determination that the rate of change has exceeded a rate of change threshold value of the threshold values and that the input-output rate has exceeded an input-output rate threshold of the threshold values.

17. The non-transitory computer readable medium of claim 15, wherein obtaining the restoration ready backup for the application using the micro-backup and the at least one previously generated backup comprises:
obtaining the at least one previously generated backup; and
combining the micro-backup and the at least one previously generated backup,
wherein the at least one previously generated backup is a scheduled backup,
wherein the at least one previously generated backup reflects a state of the application host at a first point in time,
wherein the micro-backup reflects a state of the application at a second point in time,
wherein the restoration ready backup reflects a synthetic state of the application host that never existed.

18. The non-transitory computer readable medium of claim 15, wherein the method further comprises obtaining a timestamp associated with the micro-backup, wherein the timestamp indicates a state of the application reflected by the micro-backup.

19. The non-transitory computer readable medium of claim 18, wherein:
the method further comprises cataloging the restoration ready backup as an intermediate restore point in a restore point catalog based on the timestamp while the restoration ready backup does not reflect the state of the application host indicated by the timestamp; and the intermediate restore point indicates that the application host may be restored to the state indicated by the timestamp using the restoration ready backup.

20. The non-transitory computer readable medium of claim 19, wherein the method further comprises:

obtaining a restoration request for restoration of the application host to the state indicated by the timestamp;

making an identification that the restoration ready backup may be used to perform a restoration that satisfies the restoration request by reading the restore point catalog for the intermediate restore point based on the restoration request; and performing the restoration of the application host using the restoration ready backup based on the identification.

* * * * *